Oct. 31, 1933.  A. W. BEESON  1,932,683
TRANSFER MECHANISM FOR GLASSWARE
Filed June 29, 1932
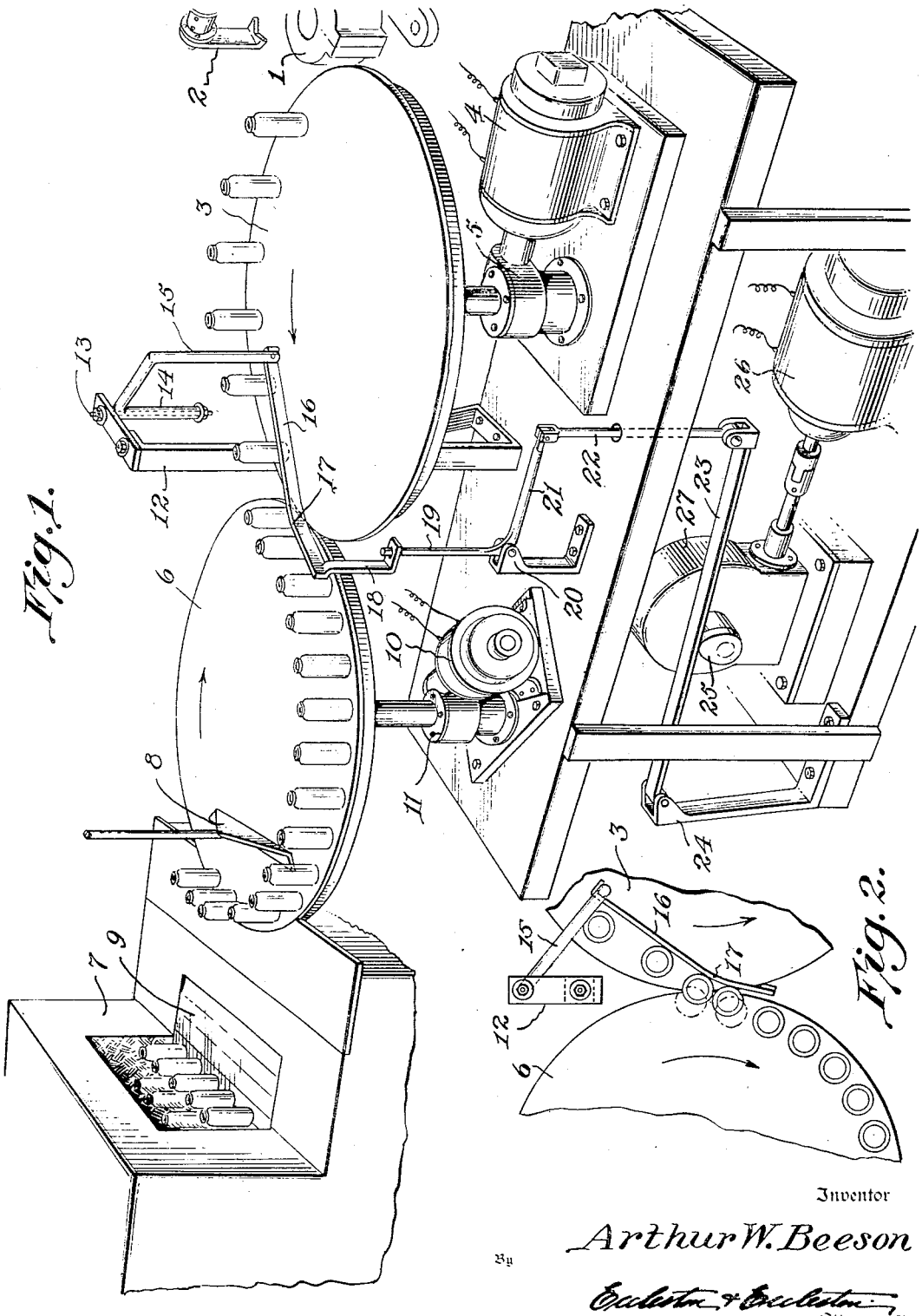
Inventor
*Arthur W. Beeson*
By *Eccleston & Eccleston*
Attorneys Patented Oct. 31, 1933

1,932,683

UNITED STATES PATENT OFFICE 1,932,683

TRANSFER MECHANISM FOR GLASSWARE

Arthur W. Beeson, Washington, Pa., assignor to Hazel-Atlas Glass Company, Wheeling, W. Va., a corporation of West Virginia Application June 29, 1932. Serial No. 619,985

5 Claims. (Cl. 198—22)

In transferring glassware from a forming machine to a leer, it is desirable to get the glass into the leer as soon as possible, but it is also desirable that the glass articles be kept from contacting with each other during the transfer and that they be properly spaced when delivered to the leer.

Heretofore it has been a common practice to employ two revolving tables, with a fixed guide to direct the ware from the first table to the second table. The glass articles as formed are delivered to the first table. This table rotates rather fast in order to get the ware to the leer as soon as possible. Consequently the distance between the articles is too great for feeding into the leer. In order to reduce the spacing between the articles, the rotation of the second table is relatively slow; and, as stated above, a fixed guide was employed to direct the ware from the first table to the second table. This guide acts as a drag on the articles, slows down their movement, and sometimes causes them to contact with each other. Also, the speed of travel of the articles slows down at the point of transfer from the first table to the second table, and this often results in the articles contacting with each other at this point. And they often remain in this undesirable relation while they are being pushed into the leer and during their travel through the leer.

The purpose of the present invention is to overcome this undesirable jambing of the articles into each other during their transfer from the forming machine to the leer; and to insure a proper and uniform spacing of the articles during their travel toward the leer as well as during their travel through the leer. This is accomplished by a very simple device, which may be termed a vibrator or oscillator, and which operates at the point of transfer between the two tables.

Other objects and advantages of the invention will be apparent to those skilled in the art from the following detailed description, when taken in connection with the accompanying drawing, in which;

Figure 1 is a perspective view of the device in combination with the rotating tables; fragments of a forming machine, take-out, leer loader and leer also being shown in the combination; and Figure 2 is a fragmentary plan view of the tables and vibrator.

Referring to the drawing in more detail, numeral 1 refers to the mold of a rotating forming machine. The jars or other articles formed by the forming machine are removed from the molds by the take-out device 2, which places them on a rotating table 3. This table is continuously rotated, and at a relatively high speed, to advance the ware to the leer as soon as possible. Accordingly, the jars or other articles delivered from the forming machine are spaced a considerable distance apart on table 3, as indicated in the drawing. Of course the table may be rotated by any desired means, and such means, per se, form no part of the present invention. However, the table is preferably driven by a motor 4 through reduction gearing 5.

Numeral 6 refers to the second table, which extends between the first table and a leer 7; the two tables being tangentially arranged. Numeral 8 refers to the pusher of a leer loader, which pushes the ware from the second table onto the leer conveyer 9. The table 6 is also preferably driven by a motor 10 through reduction gearing 11; the speed of the second table being considerably slower than that of the first table.

If the two tables rotated at the same speed then the articles on the second table would be spaced apart almost the same distance as on the first table, and hence would not be properly positioned for feeding into the leer. By rotating the second table at a slower speed it is apparent that the articles may be arranged on the second table at the desired distance apart for feeding into the leer. Heretofore it has been the practice to employ a stationary guide member to guide the articles from the first table to the second table. Such practice has not been entirely satisfactory because the articles would frequently come into contact with each other; and being quite hot, they would stick together, and often render the ware unfit for sale. As mentioned hereinbefore this was due to two causes, first, because the stationary guide member slowed down the movement of the articles in contact therewith, and second, because there was the further slowing down of the movement at the point of transfer to the slow moving table. The objectionable features are entirely removed by the substitution of the vibrator for the old stationary guide member, and this vibrator will now be described; it being understood that the invention is in no manner limited to the specific embodiment shown, which is to be considered merely as illustrative and not in any limiting sense.

Numeral 12 refers to a standard which carries a depending rod or bolt 13. Pivotally mounted on this rod is a bearing sleeve 14 of an L-shaped bracket 15. This pivot is preferably located on the line of tangency of the two tables, as shown, but of course the invention is not limited to this particular pivotal point. Secured to the lower end of the bracket 15, slightly above the surface of the table 3, is an arm 16, which is preferably formed with a bend 17, so that it is somewhat plow-shaped; the point of the plow being located where the articles are actually pushed from the first table to the second table.

The arm 16 has its end turned downwardly, as indicated by numeral 18, and is loosely connected with the upwardly extending arm 19 of a bell-crank lever which is pivoted on a bracket 20. The arm 21 of the bell-crank lever is pivoted to the upper end of a link 22. The lower end of this link is pivoted to a lever 23 which has its opposite end pivotally mounted on a bracket 24. In the specific embodiment illustrated, a cam 25 is arranged beneath the lever 23, and the continuous rotation of this cam causes the lever to be intermittently raised and lowered, whereby the vibrator arm 17 is moved back and forth. The cam 25 is preferably rotated by a motor 26 through reduction gearing 27. It will be understood that the invention is in no sense limited to the particular mounting of the vibrator arm or to the particular mechanism for vibrating such arm; it being obvious that any desired mounting on any desired operating mechanism could be employed.

In operation, the articles are taken from the molds 1 by the take-out device 2, which places them on the table 3. These articles are being continuously carried forward by the table toward the point of tangency of the two tables; and the arm 16 is continuously vibrating back and forth. If the arm were stationary, as heretofore, it would have a continuous dragging effect on the articles carried forward by the table, which would cause them to slow down and sometimes crowd together. By vibrating or oscillating the arm it is in contact with the articles for only an instant, so that the dragging effect is almost negligible.

When the bottles reach the point of tangency, and are in the act of transferring from one table to the other, they do come very close together, almost into touching relation. But at that instant the vibrator arm moves forward and sweeps the article or articles onto the second table. It is not essential to this invention that the arm be provided with a bend to give it a plow effect, but it is desirable. The desirable effect of such a construction is shown in Figure 2. At the point of tangency two articles are shown in full lines almost touching, and as the arm provided with the bend 17 moves forward the articles are not only pushed over to the other table, but also they are moved slightly away from each other, as indicated in dotted lines. Thus the articles are more or less positively spaced the desired distance apart on the second table. Of course this spacing is approximately the spacing desired between the articles as they are carried through the leer, and it is apparent that in being pushed into the leer they will remain spaced substantially the distance that they are spaced when initially arranged on the second table.

From the above description it will be apparent that I have devised a very simple device for transferring articles from one rotary table to another, in the process of transporting ware from a forming machine to a leer, and that the device will eliminate liability of contact between the articles being transferred and properly space them on the second table ready to be fed into the leer.

In accordance with the patent statutes I have described what I now believe to be the preferred form of the invention, but obviously many changes and modifications may be made without departing from the spirit of the invention, and all such changes are intended to be included within the scope of the appended claims.

What I claim is:

1. Apparatus for transferring glassware including a continuously rotating table receiving ware from a forming machine, a second continuously rotating table associated with the first-mentioned table, and a member periodically moved back and forth for transferring ware from the first-mentioned table to the second-mentioned table, said member operating independently of the rotary position of the second-mentioned table.

2. Apparatus for transferring glassware including two continuously rotating tables, the first of said tables receiving ware from a forming machine, and an oscillating member transferring ware from the first table to the second table, said member operating independently of the rotary position of either table.

3. Apparatus for transferring glassware including two continuously rotating tables, the first of said tables receiving ware from a forming machine, and a continuously vibrating arm transferring ware from the first table to the second table independently of the rotary position of either table.

4. Apparatus for transferring glassware including a continuously rotating table receiving ware from a forming machine, a second table associated with the first table and receiving ware therefrom, said second table continuously rotating at a lower speed than the first table, and an arm periodically movable back and forth independently of the rotary position of either table to transfer ware from free positions on the first table to free positions on the second table.

5. Apparatus for transferring glassware including two continuously rotating tables, the first of said tables receiving ware from a forming machine, and means acting independently of the rotary position of the second table for transferring the ware from the first table to free positions on the second table, said transferring means simultaneously spacing the ware.

ARTHUR W. BEESON.